United States Patent

[11] 3,580,502

[72] Inventor Ernest J. Duchek
 Prospect Heights, Ill.
[21] Appl. No. 811,526
[22] Filed Mar. 28, 1969
[45] Patented May 25, 1971
[73] Assignee Powers Regulator Company
 Skokie, Ill.

[54] THERMOSTATIC PRESSURE TRANSMITTER
 7 Claims, 5 Drawing Figs.
[52] U.S. Cl. ................................................. 236/102,
 236/86, 137/82, 251/234
[51] Int. Cl. ..................................................... G05d 23/275
[50] Field of Search .......................................... 236/86, 87,
 79, 102, 99; 137/82 (X); 251/234

[56] References Cited
 UNITED STATES PATENTS
| | | | |
|---|---|---|---|
| 1,284,335 | 11/1918 | Hodge | 236/86 |
| 1,503,971 | 8/1924 | Bast | 236/86 |
| 2,823,688 | 2/1958 | Stokes et al. | 137/79 |
| 3,145,722 | 8/1964 | Mueller | 137/85 |

Primary Examiner—William E. Wayner
Attorneys—Hume, Clement, Hume & Lee and James B. Blanchard ABSTRACT: A temperature actuated pressure transmitter adapted to sense a temperature and transmit a proportional fluid signal. The transmitter includes a fluid pressure chamber, a cantilevered blade having a free end extended longitudinally adjacent said pressure chamber, a temperature sensing element adapted to transmit a force to said blade in response to a sensed temperature, and an exhaust nozzle assembly positioned in fluid communication with said chamber through which the fluid in said chamber can be exhausted. A valve member provided in an exhaust port of said nozzle assembly is engaged with the free end of said blade and is adapted to vary the rate of exhaust through said port and thereby vary the pressure in said chamber in accordance with the force transmitted to the valve member through the lever arm of said blade. The pressure in said chamber is thereby changed in proportion to the temperature sensed by said sensing means. In accordance with this invention, the nozzle assembly can be translated longitudinally with respect to the blade to adjust the span of the transmitter by adjusting the effective lever arm through which said blade operates against the valve member.

PATENTED MAY25 1971 3,580,502

Inventor
Ernest J. Duchek

By Hume, Clement, Hume & Lee
Attorneys

Inventor
Ernest J. Duchek
By Hume, Clement, Hume & Lee
Attorneys

THERMOSTATIC PRESSURE TRANSMITTER

BACKGROUND AND GENERAL DESCRIPTION

This invention relates generally to pressure transmitters and more specifically relates to a temperature actuated pressure transmitter having a span adjustment feature.

It is well known in the art to use thermostatic pressure transmitters which sense a temperature and transmit a proportional pneumatic or other type of fluid signal to some remotely located receiver gauge or indicator. Such assemblies are used in commercial installations involving fans, compressors, air conditioning equipment and the like to transmit a fluid signal indicative of the temperature of the installation to a remote point.

One form of thermostatic pressure transmitter in current use includes a blade which is connected to a temperature sensing device and further engaged with the exhaust valve of a pressurized fluid system. Such transmitters create a pressure signal indicative of the temperature sensed by the sensing device by varying the force transmitted to the valve through the lever arm of the blade as a result of the application of a force to the blade by the temperature sensing device. The rate of flow through the exhaust valve and, therefore, the pressure in the fluid system are thereby varied in accordance with the temperature sensed by the sensing device.

In the past, these blade-type thermostatic transmitters have been provided with various means to adjust the span of the transmitter, that is, to adjust the change in output pressure per unit change in sensed temperature. The span adjustment devices previously used in these transmitters generally have involved linkages and mechanisms devised in an attempt to effect a change in the force which the blade applies to the exhaust valve of a fixed exhaust nozzle assembly. Such previous attempts to provide a span adjustment for blade-type transmitters generally have required complicated mechanical arrangements which added materially to the production cost of the transmitter and which, in some cases, adversely affected the operation of the transmitter.

In accordance with this invention, the above problems in providing a blade-type transmitter with span adjustment means are alleviated by providing the transmitter with a movable exhaust nozzle assembly. By such an arrangement, the exhaust nozzle assembly can be translated longitudinally with respect to the blade member of the transmitter to change the effective lever arm through which the blades acts upon the exhaust valve provided on the nozzle assembly. The problems incident to designing span adjustment devices for use in transmitters having a fixed nozzle assembly are thereby avoided, since this invention permits the span of the transmitter to be adjusted easily by selectively moving the nozzle assembly longitudinally with respect to the blade.

Broadly described, the thermostatic pressure transmitter in accordance with this invention comprises a blade-type transmitter having a movable nozzle assembly positioned adjacent the free end of the blade. A force transmitted to the valve of the movable nozzle assembly through the lever arm of the blade, in response to the temperature sensed by a sensing element joined to the blade, thereby creates a pressure signal indicative of the sensed temperature. Further, movement of the exhaust nozzle assembly with respect to the blade varies the effective lever arm of the blade and thereby adjusts the span of the transmitter.

Further objects and advantages of the present invention will become evident from the following description of two embodiments thereof, taken in conjunction with the drawings in which.

Figure 1:
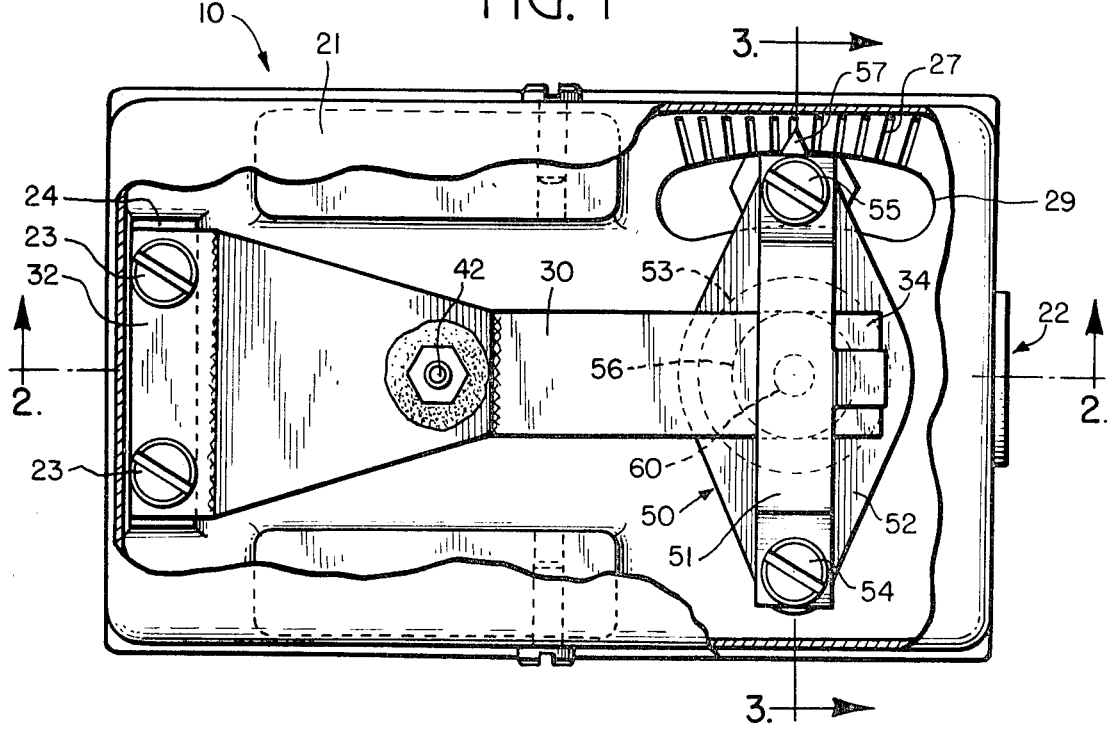
FIG. 1 is a plan view of one embodiment of the transmitter adapted to be actuated by a rigid bulb temperature sensing element, as viewed along the line 1–1 in FIG. 2.
Figure 2:
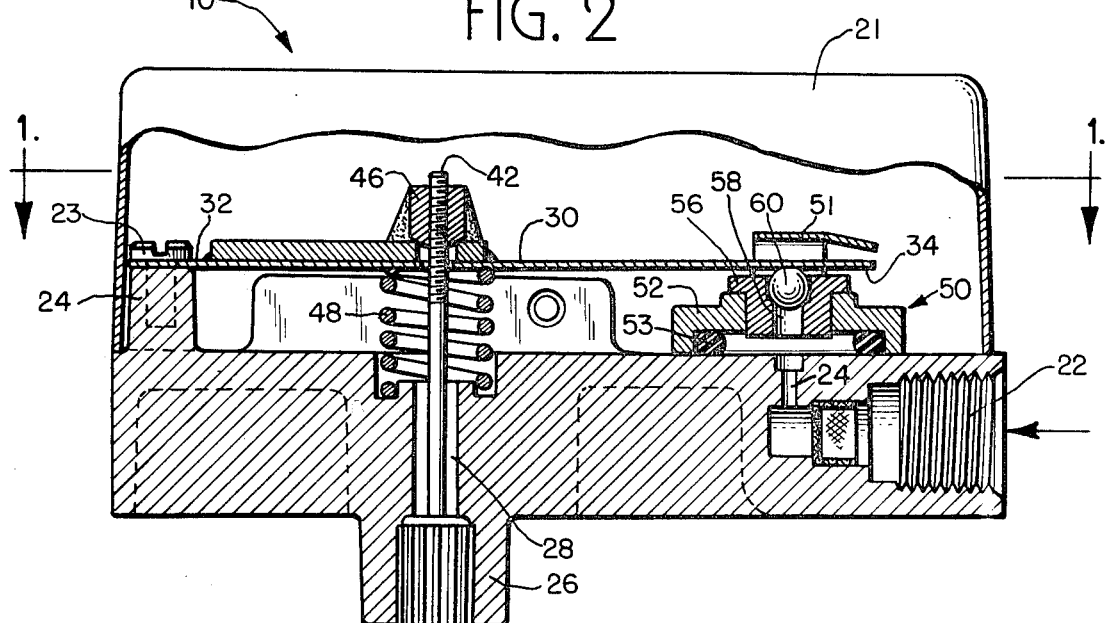
FIG. 2 is an elevational view of the transmitter, as viewed along the line 2–2 in FIG. 1.
Figure 3:
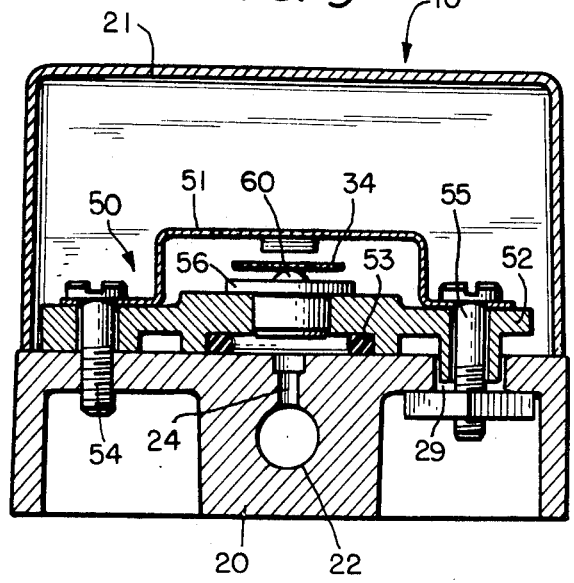
FIG. 3 is a cross-sectional elevational view of the transmitter, as viewed along the line 3–3 of FIG. 1.

One embodiment of the temperature actuated pressure transmitter of the instant invention is generally indicated by the reference numeral 10 in FIGS. 1—4. Generally, the transmitter 10 includes a base member 20 and a protective cover plate 21. The base 20 defines an interior pressure chamber 22 at one end and a post member 24 at the opposite end. The pressure chamber 22 is adapted to be connected to a fluid pressure supply source through an upstream restriction (not shown), as well known to those skilled in the art. As indicated in FIG. 2, a conduit 25 defined in the base 20 places the chamber 22 in fluid communication with the adjacent top surface of the base.

The transmitter 10 further includes a cantilevered blade 30. One end 32 of the blade 30 is fixed to the post 24 on the base member 20, such as by screws 23, in a manner which prevents lateral movement of the blade. The blade 30 extends longitudinally from the post 24 so that its free end 34 is positioned above the pressure chamber 22, preferably directly over the conduit 25. The free end 34 of the cantilevered blade 30 is thereby free to move vertically toward or away from the conduit 25 leading from the pressure chamber 22.

The transmitter 10 in accordance with this invention also includes a temperature sensing device 40. In the embodiment illustrated in FIGS. 1—4, the sensing device 40 comprises a conventional rigid bulb assembly including bimetallic elements, such as the tubular element 42 and the rod element 44. As well known by those skilled in the art, the elements 42 and 44 have different coefficients of expansion and are capable of moving through a displacement which is proportional to the temperature sensed by the elements.

The temperature sensing device 40 is rigidly secured to the transmitter base 20 by means of a boss member 26 which receives the tubular element 42. A vertical opening 28 in the base 20 allows the rod element 44 to project upwardly through the base. As indicated in FIG. 2, the rod element 44 also extends upwardly past the blade 30 through an aperture 38 provided in the blade, and the upper end of the rod is joined to the blade 30, between the ends of the blade, by an adjustable nut 46. A preloaded compression spring 48, positioned between the base 20 and the blade 30, urges the blade 30 upwardly to maintain the blade in engagement with the nut 46.

As well known to those skilled in the art, the bimetallic elements 42 and 44 of the temperature sensing device 40 will expand or contract in response to the temperature changes of the surrounding environment. Thus, by the above-described arrangement, the rod element 44 will exert a force on the blade 30, through the adjusting nut 46, which is a direct function of the environmental temperature sensed by the device 40 and the spring rates of the spring 48 and the blade 30. Further, the nut 46 permits the zero setting of the transmitter temperature sensing device to be adjusted.

In accordance with this invention, the transmitter 10 also includes a movable exhaust nozzle assembly 50, through which the fluid in the chamber 22 can be exhausted. The assembly 50 is positioned on the transmitter base 20 below the free end 34 of the blade 30 and is capable of translating on the base 20 longitudinally with respect to the blade.

Figure 4:
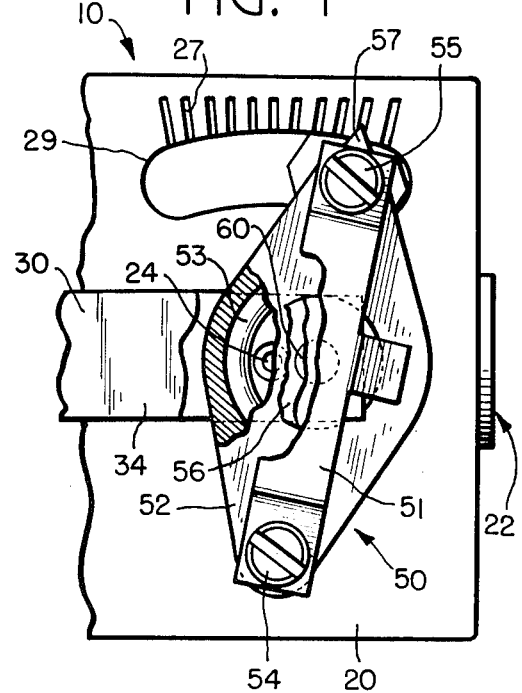
FIG. 4 is an enlarged fragmentary view of the movable exhaust nozzle assembly of the transmitter in accordance with this invention.

The illustrated assembly 50 in accordance with this invention includes a hollow valve seat member 52 which is slidably engaged with the top surface of the base 20, and which extends transversely across the free end 34 of the blade 30. This arrangement places the interior of the member 52 in fluid communication with the conduit 25 connected to the pressure chamber 22. As indicated in FIGS. 1 and 4, one end of the member 52 is pivotally secured to the base 20 by a pivot pin 54, while the other end of the member 52 is free to slide on the base 20 through a predetermined arc. A brace 51 can be provided on the member 52 to protect the free end 34 of the arm 30 from damage during storage or shipment.

The arc through which the free end of the member 52 slides is controlled by providing that end of the member with a pin 55 which engages within an arcuate slot 29 provided in the base 20. The limits of the slot 29 are selected so that the interior of the member 52 remains in fluid communication with the conduit 25 as a member 52 is moved between its extreme positions (see FIGS. 4 and 5). A pointer 57 can be provided on the free end of the member 52, and scale markings 27 can be arranged on the base 20 adjacent the slot 29 to indicate the relative position of the member 52. A suitable gasket material such as an O-ring 53 is provided to seal the member 52 against the base 20, and thereby assure that the interior of the member 52 is in sealed fluid communication with the pressure chamber 22 through the conduit 25.

The assembly 50 also includes a valve seat 56 mounted in the center of the seat member 52 directly below the free end 34 of the blade 30. The seat 56 defines an exhaust port 58 through which the fluid from the chamber 22 can exhaust during the operation of the transmitter. Further, a ball valve 60 is positioned in the upper outlet end of the port 58 and is capable of moving within the port to control the rate of flow of fluid through the port. As indicated in FIG. 2, the ball valve 60 is engaged with the free end 34 of the blade 30. By this arrangement, the transmitter is adapted so that the force transmitted to the ball valve 60 through the blade 30 changes the balance of forces on the ball valve due to the blade and the pressure of the fluid in the chamber 22, and changes the position of the ball valve within the port 58. The force of the blade 30 on the ball valve 60 thereby controls the pressure in the chamber 22 by varying the rate at which fluid will exhaust from the chamber through the port 58.

Figure 5:
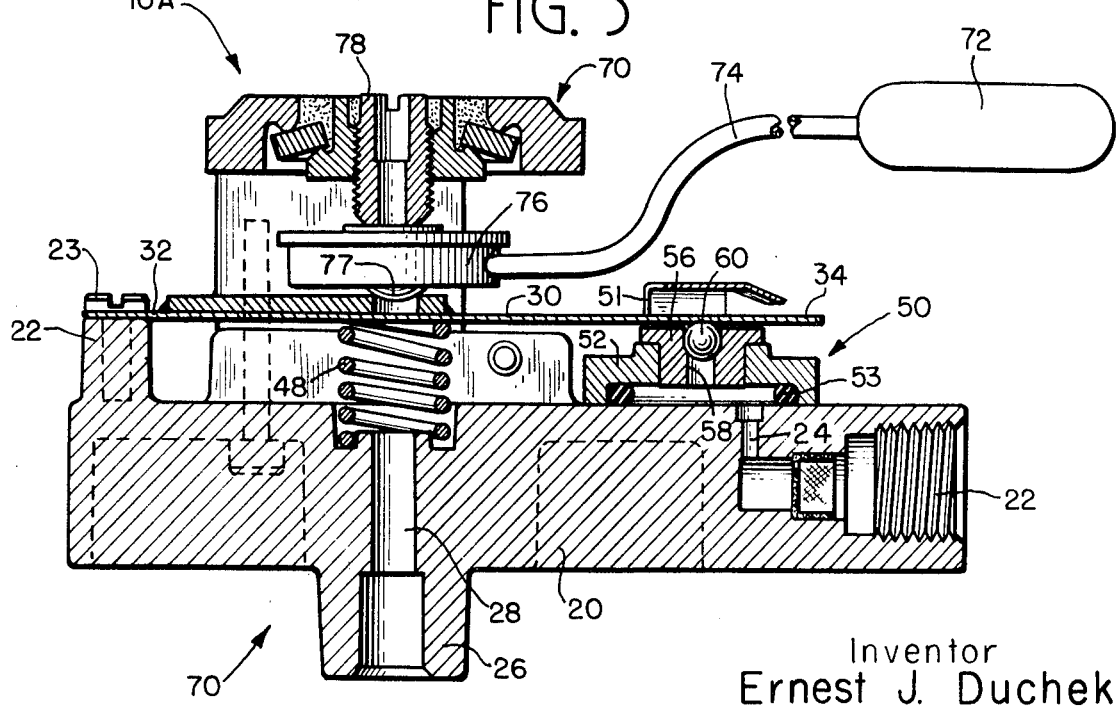
FIG. 5 is a cross-sectional elevational view of a second embodiment of the transmitter adapted to be actuated by a remote bulb temperature sensing element.

A modified transmitter 10A, constructed in accordance with this invention, is illustrated in FIG. 5. The structure of the transmitter 10A is essentially the same as in the above-described transmitter 10, and the same reference numerals have been used in FIG. 5 to identify the common components. The transmitter 10A differs from the transmitter 10 to the extent that the rigid bulb temperature sensing device 40 of the transmitter 10 is replaced by a conventional remote bulb temperature sensing device 70 in the transmitter 10A.

As shown in FIG. 5, the temperature sensing device 70 includes a bulb 72 which is filled with a thermally expansive fluid. The bulb 72 thus can be placed at a point remote from the transmitter 10A, and the fluid in the bulb will sense the temperature at that point. A fluid conduit 74 connects the remote bulb 72 to a flexible diaphragm 76 mounted on the transmitter 10A. By this arrangement, the change in pressure in the bulb 72 resulting from the expansion of the fluid therein will be transmitted to the diaphragm 76 and will cause an expansion of the diaphragm in accordance with the temperature sensed by the bulb.

The lower portion of the diaphragm 76 includes a protrusion 77 which engages with the cantilevered blade 30 between the ends of the blade. The protrusion 77 thereby transmits a force to the blade 30, against the resistance of the preloaded spring 48, in proportion to the expansion of the diaphragm 76. In this manner, the diaphragm 76 subjects the blade 30 to a force which is directly related to the temperature sensed by the remote bulb 72 and the spring rates of the spring 48 and the blade 30. An adjusting screw 78 is engaged with the top portion of the diaphragm 76, and permits the zero setting of the temperature sensing device 70 to be adjusted.

During the operation of the transmitter, in accordance with this invention, the chamber 22 is connected to a fluid pressure source and a remotely located receiver gauge through an upstream restriction. The supply fluid is continuously exhausted from the chamber 22 through the conduit 25 and the port 58. The rate of exhaust of the fluid, and thus the pressure in chamber 22, is controlled by the force applied to the ball valve 60 by the free end of the blade 30. A variation in the force of the blade 30 on the ball 60 will thus vary the rate of exhaust and correspondingly adjust the pressure in the chamber 22.

In addition, the temperature at the point being controlled is sensed and converted to a corresponding force on the blade 30 by the temperature sensing means provided on the transmitter. For instance, in the embodiment shown in FIGS. 1—4, an increased temperature sensed by the bimetal elements 42 and 44 will expand the elements, and the elements will transmit an increased force to the blade 30 through the adjusting nut 46. In the embodiment shown in FIG. 5, an increased temperature sensed by the remote bulb 72 expands the bulb and the connected diaphragm 76, and the diaphragm 76 will transmit an increased force to the blade 30 through the protrusion 77. In both embodiments the blade 30 in turn transmits the increased force of the temperature sensing devices to the ball valve 60 of the exhaust nozzle assembly 50 through a substantial lever arm "L" defined by the blade (see FIG. 2). The force on the ball valve 60 and the rate of exhaust of the fluid from the chamber 22 are varied in direct relation to the temperature sensed by the transmitter. This action thereby varies the pressure in the chamber 22 proportionately so that the connected receiver gauge indicates the sensed temperature.

From the above description of the transmitter, in accordance with this invention, it is evident that the span of the transmitter is a function of the length of the lever arm "L" through which the force of the blade 30 acts upon the ball valve 60 of the exhaust nozzle assembly 50. In accordance with this invention, the span of the transmitter can be adjusted by pivoting the movable nozzle assembly 50 about the pivot pin 54 to move the ball valve 60 longitudinally with respect to the blade 30 and thereby change the effective length of the blade lever arm "L". For instance, the assembly 50 can be pivoted from its normal position as shown in FIG. 1 to an outward position such as shown in FIG. 4, to increase the length of the lever arm "L" and correspondingly increase the span. Alternatively, the assembly 50 can be pivoted inwardly into a position such as shown in FIG. 5 to decrease the lever arm "L" and thereby increase the span.

Although the transmitter in accordance with this invention has been described above with reference to two particular embodiments, it should be understood that the present disclosure has been made only by way of example. Consequently, numerous changes in the details of construction as well as in the modes of utilization will be apparent to those skilled in the art and may be resorted to without departing from the spirit and scope of the invention as claimed.

I claim:
1. A temperature actuated pressure transmitter comprising:
   a. a base member;
   b. a cantilevered blade having a fixed end secured to said base member and a longitudinally extending free end;
   c. a pressure chamber provided adjacent the free end of said blade and adapted to be connected to a fluid pressure system;
   d. a movable exhaust nozzle assembly arranged in sealed fluid communication with said pressure chamber, said nozzle assembly including an exhaust port adapted to exhaust the fluid from said pressure chamber and a valve member operatively engaged with the free end of said blade and adapted to vary the flow of exhaust fluid through said port in accordance with the force applied to said valve member by said blade, said exhaust nozzle assembly being adjustably movable longitudinally of said longitudinally extending free end of blade; and
   e. temperature sensing means engaged with said blade intermediate its ends for exerting a force on said valve member through the lever arm of said blade, to thereby adjust the valving action of said valve member and change the fluid pressure in said pressure chamber in proportion to the temperature sensed by said sensing means; whereby said exhaust nozzle assembly can be translated longitudinally with respect to said longitudinally extending free end of said blade to selectively adjust the effective lever arm through which said blade acts upon said valve member and thereby adjust the span of said transmitter.

2. A temperature actuated pressure transmitter in accordance with claim 1 wherein said movable exhaust nozzle assembly comprises valve seat means slidably engaged with said base member in sealed fluid communication with said pressure chamber and defining an exhaust port having an outlet adjacent said free end of said blade, and wherein said valve member comprises a ball valve positioned in said exhaust port and engaged with the free end of said blade, with said ball valve being adapted to change the rate of exhaust of fluid through said port and thereby change the pressure in said chamber in proportion to the force applied to said ball valve by said blade.

3. A temperature actuated pressure transmitter in accordance with claim 2 wherein said ball valve is arranged in said exhaust outlet port to restrict the flow of exhaust through said port and thereby increase the pressure in said chamber in response to an increase in the force applied to said valve by said blade.

4. A temperature actuated pressure transmitter in accordance with claim 1 wherein said nozzle assembly is pivoted at one end so as to extend transversely across the free end of said blade such that pivotal movement of said nozzle assembly through a predetermined arc effectively varies the lever arm length through which said blade acts upon said valve member.

5. A temperature actuated pressure transmitter comprising:
 a. a base member;
 b. a cantilevered blade having one end fixed to said base member and having a longitudinally extending free end;
 c. a pressure chamber provided in said base member adjacent the free end of said blade and adapted to be connected to a fluid pressure source;
 d. a longitudinally movable exhaust nozzle assembly pivoted to said base member adjacent said free end of said blade and in fluid communication with said pressure chamber, said nozzle assembly including a valve seat defining an exhaust port adjacent said blade member and further including a valve positioned within said port in engagement with the free end of said blade and adapted to vary the exhaust of fluid through said port in response to a force applied to said valve by said blade, said exhaust nozzle assembly being adjustably movable longitudinally of said longitudinally extending free end of said blade;
 e. means sealing said nozzle assembly with respect to said base member; and
 f. a temperature responsive element engaged with said blade intermediate its ends and adapted to exert a force on said blade in proportion to a sensed temperature so that said blade exerts a proportionate force on said valve through a lever arm and said element and said blade cooperate to change the pressure in said chamber in proportion to the temperature sensed by said element by varying the exhaust through said port;
 whereby said exhaust nozzle assembly can be translated longitudinally with respect to said longitudinally extending free end of said blade to selectively adjust the effective lever arm through which said blade acts upon said valve member and thereby adjust the span of said transmitter.

6. In a temperature actuated pressure transmitter including a blade having a longitudinally extending free end, a temperature sensing means adapted to transmit a force to said blade in accordance with a sensed temperature, and a pressure chamber adapted for connection with a fluid pressure system, the improvement comprising a movable exhaust nozzle assembly which permits the span of the transmitter to be adjusted, said assembly comprising:
 a. a valve seat arranged for translation longitudinally of said longitudinally extending free end of said blade while being maintained in sealed fluid communication with said chamber;
 b. an exhaust port defined in said seat through which the fluid can be exhaust from said chamber; and
 c. a valve member positioned within said port and operatively engaged with the free end of said blade so that a force transmitted to said valve member through the lever arm of said blade varies the flow of exhaust fluid through said port and thereby varies the pressure in said chamber;
 whereby the pressure in said chamber changes in response to the temperature sensed by said sensing means and said nozzle assembly can be translated longitudinally with respect to said longitudinally extending free end of said blade to selectively adjust the effective lever arm through which said blade acts on said valve member and thereby adjust the span of said transmitter.

7. A physical condition actuated pressure transmitter comprising:
 a. a base member;
 b. a cantilevered blade having a fixed end secured to said base member and a longitudinally extending free end;
 c. a pressure chamber provided adjacent the free end of said blade and having an inlet port for connection to a fluid pressure system;
 d. a movable force balance exhaust nozzle assembly arranged in sealed fluid communication with said pressure chamber, said nozzle assembly including an exhaust port for exhaust of fluid from said pressure chamber and a valve member operatively engaged with said longitudinally extending free end of said blade for varying the flow of exhaust fluid through said port in accordance with the force applied to said valve member by said blade, said exhaust nozzle assembly being adjustably movable longitudinally of said longitudinally extending free end of said blade; and
 e. physical condition sensing means engaged with said blade intermediate its ends for exerting a force on said valve member through the lever arm formed by said blade which force varies as a function of the magnitude of the physical condition sensed by said physical condition sensing means to thereby adjust the valving action of said valve member to vary the fluid pressure in said pressure chamber as a function of the magnitude of the physical condition sensed by said physical condition sensing means;
 whereby said exhaust nozzle can be translated longitudinally with respect to said longitudinally extending free end of said blade to selectively adjust the effective lever arm through which said blade acts upon said valve member and thereby adjust the span of said transmitter.